United States Patent
Kulanko

(10) Patent No.: US 8,214,539 B1
(45) Date of Patent: Jul. 3, 2012

(54) COMMAND MAPPING SYSTEMS RELATING INPUT DEVICES TO APPLICATION PROGRAM INTERFACES

(76) Inventor: Robert J. Kulanko, Stroudsburg, PA (US)

( * ) Notice: Subject to any disclaimer, the term of this patent is extended or adjusted under 35 U.S.C. 154(b) by 38 days.

(21) Appl. No.: 12/703,090

(22) Filed: Feb. 9, 2010

Related U.S. Application Data

(60) Provisional application No. 61/154,696, filed on Feb. 23, 2009, provisional application No. 61/176,053, filed on May 6, 2009.

(51) Int. Cl.
*G06F 3/00* (2006.01)
*G01D 1/00* (2006.01)
(52) U.S. Cl. .......................................... 710/5; 702/125
(58) Field of Classification Search ....... 710/5; 702/125
See application file for complete search history.

(56) References Cited

U.S. PATENT DOCUMENTS

| | | | |
|---|---|---|---|
| 5,261,079 A | 11/1993 | Celi, Jr. | |
| 5,838,307 A | 11/1998 | Boulton | |
| 6,100,875 A | 8/2000 | Goodman et al. | |
| 6,615,299 B1 | 9/2003 | Chu et al. | |
| 6,727,884 B1 | 4/2004 | Leatham et al. | |
| 7,096,473 B2 * | 8/2006 | Ruget et al. | 719/321 |
| 7,315,791 B2 * | 1/2008 | Ilic et al. | 702/125 |
| 7,369,117 B2 | 5/2008 | Evans et al. | |
| 2004/0263477 A1 | 12/2004 | Davenport et al. | |
| 2005/0119036 A1 | 6/2005 | Albanna et al. | |
| 2005/0183098 A1 * | 8/2005 | Ilic et al. | 719/328 |
| 2007/0174818 A1 * | 7/2007 | Pasula | 717/136 |

FOREIGN PATENT DOCUMENTS

WO WO9705542 A2 2/1997

\* cited by examiner

*Primary Examiner* — Hyun Nam
(74) *Attorney, Agent, or Firm* — Charles L. Riddle; Riddle Patent La, LLC

(57) ABSTRACT

Command mapping systems that provide extended command functions to input devices in addition to translating between multiple APIs to provide compatibility between a user-selected input device and a user-selected program.

10 Claims, 6 Drawing Sheets

COMMAND MAPPING SYSTEMS RELATING INPUT DEVICES TO APPLICATION PROGRAM INTERFACES

CROSS REFERENCE TO RELATED APPLICATION

The present application is related to and claims priority from prior provisional application Ser. No. 61/154,696, filed Feb. 23, 2009, entitled "COMMAND MAPPING SYSTEMS"; and, this application is related to and claims priority from prior provisional application Ser. No. 61/176,053, filed May 6, 2009, entitled "COMMAND MAPPING SYSTEMS", the contents of both of which are incorporated herein by this reference and are not admitted to be prior art with respect to the present invention by the mention in this cross-reference section.

BACKGROUND

This invention relates to providing a system for improved command mapping systems. More particularly, this invention relates to providing a system for mapping commands relating to input devices to programs. Many programs have limited or no support for input devices. Some programs only work with the latest control pads; others only use mouse and/or keyboard input; and still others only support older input devices. An input device command mapping system is needed to bridge the compatibility gap between input devices and programs.

OBJECTS AND FEATURES OF THE INVENTION

A primary object and feature of the present invention is to provide a command mapping system overcoming the above-mentioned problems.

It is a further object and feature of the present invention to provide such a command mapping system that provides compatibility between a user-selected input device and a user-selected program.

A further object and feature of the present invention is to provide such a command mapping system capable of communicating with multiple device APIs, as well as translating commands between them.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a computer system, relating to rendering at least one first human interface device and at least one first application compatible with at least one second human interface device and at least one second application, such computer system comprising: at least one control function association computer storage structured and arranged to assist storing at least one association between at least one first control function and at least one second control function; at least one control function intercepting computer processor structured and arranged to assist intercepting such at least one first control function in at least one first control interface compatible with at least one first human interface device and at least one first application; and at least one control function injecting computer processor structured and arranged to assist injecting such at least one second control function, according to such at least one association, into at least one second control interface compatible with at least one second human interface device and at least one second application; wherein such at least one first human interface device and such at least one first application are rendered compatible with such at least one second human interface device and such at least one second application. Moreover, it provides such a computer system further comprising at least one control function behavior distinguisher computer processor structured and arranged to distinguish multiple behaviors of such at least one first control function.

Additionally, it provides such a computer system wherein such at least one control function behavior distinguisher computer processor comprises at least one control function duration behavior distinguisher computer processor structured and arranged to distinguish duration dependent activation of one of such at least one first control function. Also, it provides such a computer system wherein such at least one control function behavior distinguisher computer processor comprises at least one control function continuously active behavior distinguisher computer processor structured and arranged to distinguish a continuous active state of one of such at least one first control function.

In addition, it provides such a computer system wherein such at least one control function behavior distinguisher computer processor comprises at least one control function releasing behavior distinguisher computer processor structured and arranged to distinguish release from an active state of one of such at least one first control function. And, it provides such a computer system wherein such at least one control function behavior distinguisher computer processor comprises at least one control function sequential activation behavior distinguisher computer processor structured and arranged to distinguish multiple sequential activations of such at least one first control function.

Further, it provides such a computer system wherein such at least one control function behavior distinguisher computer processor comprises at least one control function sequential activation behavior distinguisher computer processor structured and arranged to distinguish multiple simultaneous activations of at least two of such at least one first control function. Even further, it provides such a computer system wherein such at least one control function behavior distinguisher computer processor comprises at least one control function position variation behavior distinguisher computer processor structured and arranged to distinguish variation of position of such at least one first control function.

Moreover, it provides such a computer system wherein such at least one control function injecting computer processor comprises at least one settings adjusting computer processor structured and arranged to assist adjusting operating system settings. Additionally, it provides such a computer system wherein such at least one control function injecting computer processor comprises at least one executing computer processor structured and arranged to assist executing at least one application. Also, it provides such a computer system wherein such at least one control function injecting computer processor comprises at least one feedback producing computer processor structured and arranged to assist producing at least one feedback effect.

In addition, it provides such a computer system wherein such at least one control function injecting computer processor comprises at least one association adjusting computer processor structured and arranged to assist adjusting such at least one association. And, it provides such a computer system wherein such at least one control function intercepting computer processor comprises at least one game controller origin intercepting computer processor structured and arranged to assist intercepting such at least one first control function originating from at least one game controller. Further, it provides such a computer system wherein such at least one control function intercepting computer processor comprises at least one feedback-enabled game controller origin intercepting computer processor structured and arranged to assist intercepting such at least one first control function originating from at least one feedback-receiving-enabled game controller.

Even further, it provides such a computer system wherein such at least one control function intercepting computer processor comprises at least one keyboard origin intercepting computer processor structured and arranged to assist intercepting such at least one first control function originating from at least one keyboard. Even further, it provides such a computer system wherein such at least one control function intercepting computer processor comprises at least one mouse origin intercepting computer processor structured and arranged to assist intercepting such at least one first control function originating from at least one mouse.

Even further, it provides such a computer system wherein such at least one control function injecting computer processor comprises at least one feedback-enabling injecting computer processor structured and arranged to assist injecting such at least one second control function, according to such at least one association, into at least one second control interface compatible with at least one feedback-enabled human interface device.

In accordance with another preferred embodiment hereof, this invention provides a computer system, relating to rendering at least one first human interface device and at least one first application compatible with at least one second human interface device and at least one second application, such computer system comprising: control function association computer storage means for assisting storing at least one association between at least one first control function and at least one second control function; control function intercepting computer processor means for assisting intercepting such at least one first control function in at least one first control interface compatible with at least one first human interface device and at least one first application; and control function injecting computer processor means for assisting injecting such at least one second control function, according to such at least one association, into at least one second control interface compatible with at least one second human interface device and at least one second application; wherein such at least one first human interface device and such at least one first application are rendered compatible with such at least one second human interface device and such at least one second application. Even further, it provides such a computer system further comprising at least one control function behavior distinguisher computer processor means for distinguishing multiple behaviors of such at least one first control function.

In accordance with another preferred embodiment hereof, this invention provides a computer system, relating to rendering at least one first human interface device and at least one first application compatible with at least one second human interface device and at least one second application, such computer system comprising: at least one control function association computer storage structured and arranged to assist storing at least one association between at least one first control function and at least one second control function; at least one control function intercepting computer processor structured and arranged to assist intercepting such at least one first control function in at least one first control interface compatible with at least one first human interface device and at least one first application; at least one control function injecting computer processor structured and arranged to assist injecting such at least one second control function, according to such at least one association, into at least one second control interface compatible with at least one second human interface device and at least one second application; and at least one control function behavior distinguisher computer processor structured and arranged to distinguish multiple behaviors of such at least one first control function; wherein such at least one first human interface device and such at least one first application are rendered compatible with such at least one second human interface device and such at least one second application; wherein such at least one control function behavior distinguisher computer processor comprises at least one computer processor selected from the group consisting of at least one control function duration behavior distinguisher computer processor structured and arranged to distinguish duration dependent activation of one of such at least one first control function, at least one control function continuously active behavior distinguisher computer processor structured and arranged to distinguish a continuous active state of one of such at least one first control function, at least one control function releasing behavior distinguisher computer processor structured and arranged to distinguish release from an active state of one of such at least one first control function, at least one control function sequential activation behavior distinguisher computer processor structured and arranged to distinguish multiple sequential activations of such at least one first control function, at least one control function sequential activation behavior distinguisher computer processor structured and arranged to distinguish multiple simultaneous activations of at least two of such at least one first control function, and at least one control function position variation behavior distinguisher computer processor structured and arranged to distinguish variation of position of such at least one first control function; wherein such at least one control function injecting computer processor comprises at least one computer processor selected from the group consisting of at least one settings adjusting computer processor structured and arranged to assist adjusting operating system settings, at least one executing computer processor structured and arranged to assist executing at least one application, at least one feedback producing computer processor structured and arranged to assist producing at least one feedback effect, and at least one association adjusting computer processor structured and arranged to assist adjusting such at least one association; and wherein such at least one control function intercepting computer processor comprises at least one computer processor selected from the group consisting of at least one game controller origin intercepting computer processor structured and arranged to assist intercepting such at least one first control function originating from at least one game controller, at least one feedback-enabled game controller origin intercepting computer processor structured and arranged to assist intercepting such at least one first control function originating from at least one feedback-receiving-enabled game controller, at least one keyboard origin intercepting computer processor structured and arranged to assist intercepting such at least one first control function originating from at least one keyboard, and at least one mouse origin intercepting computer processor structured and arranged to assist intercepting such at least one first control function originating from at least one mouse.

Moreover, it provides such a computer system wherein such at least one control function injecting computer processor comprises at least one feedback-enabling injecting computer processor structured and arranged to assist injecting such at least one second control function, according to such at least one association, into at least one second control interface compatible with at least one feedback-enabled human interface device. In accordance with another preferred embodiment hereof, this invention provides for each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
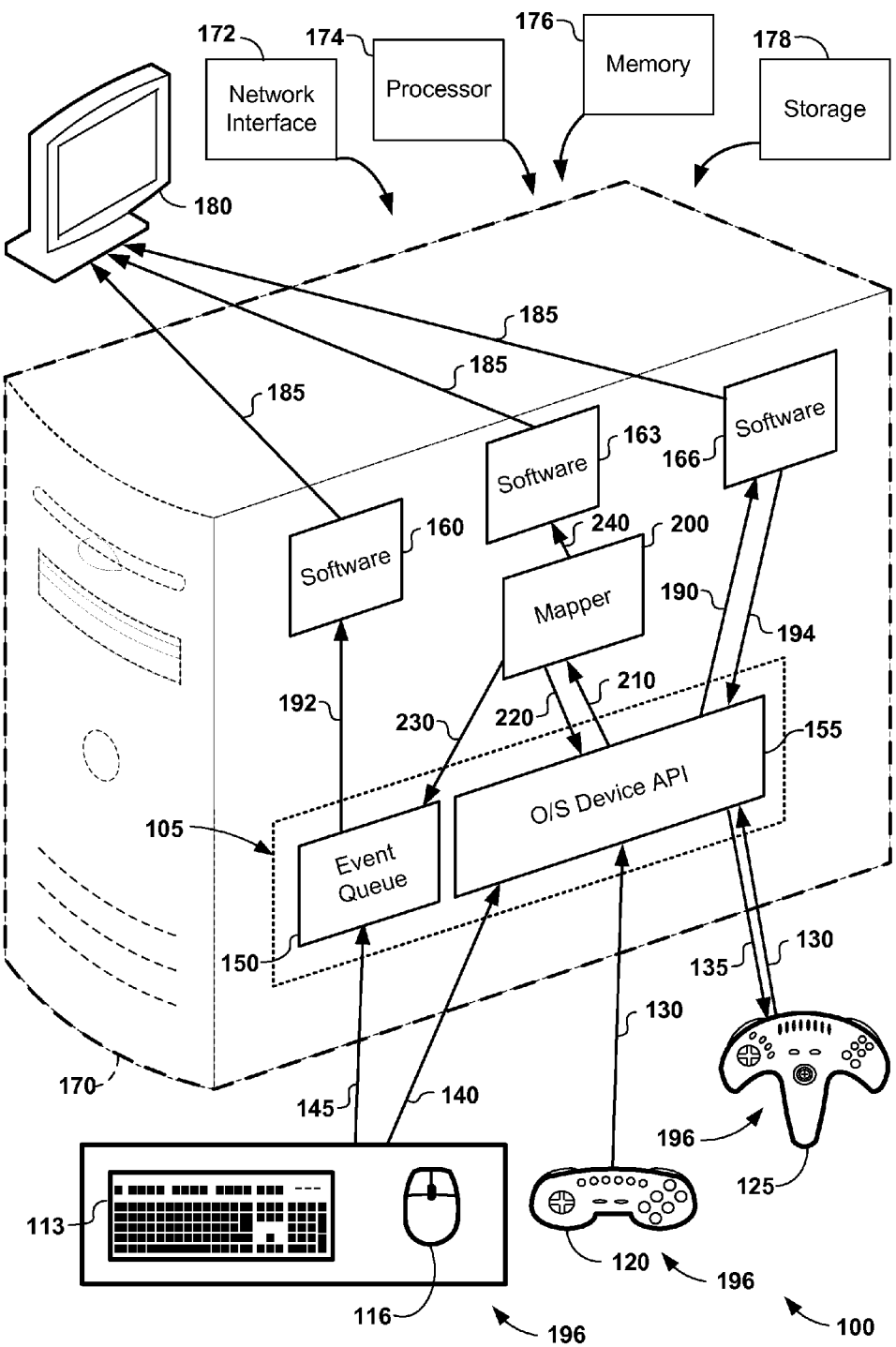
FIG. 1 shows a diagrammatic flow chart of a command mapping system, illustrating use of at least one command mapper within at least one computer, according to a preferred embodiment of the present invention.

FIG. 1 shows a diagrammatic flow chart of a command mapping system 100, illustrating use of at least one command mapper 200 within at least one computer 170, according to a preferred embodiment of the present invention. In command mapping system 100, computer 170 preferably comprises at least one processor 174, at least one memory device 176, and at least one storage device 178, as shown. Computer 170, when utilizing network compatible software, preferably further comprises at least one network interface 172, as shown.

Computer 170 preferably operates using at least one operating system 105, as shown, preferably MICROSOFT WINDOWS®. Upon reading this specification, those skilled in the art will now appreciate that, under appropriate circumstances, considering such issues, as cost, available technology, user preference, etc., other operating systems, such as, for example, UNIX®, LINUX®, MAC OS®, etc., may suffice.

Computer 170 preferably receives input from at least one input device 196, and preferably produces output 185 to at least one output device 180, as shown, preferably at least one display. Upon reading this specification, those skilled in the art will now appreciate that, under appropriate circumstances, considering such issues as future technology, program output, etc., other output devices, such as, for example, audio devices, printing devices, motorized equipment, etc., may suffice.

Operating system 105 preferably comprises at least one event queue 150 and preferably at least one input device API 155, as shown. Event queue 150, preferably comprising WINDOWS® message loop in MICROSOFT WINDOWS®, usually handles input from at least one keyboard 113 and from at least one mouse 116, as shown. Input device API 155 preferably handles input from input device 196, including keyboard 113 and mouse 116, as shown, when direct programming control is needed. Input device API 155 in MICROSOFT WINDOWS® preferably comprises DIRECTINPUT®, alternately preferably XINPUT™. Upon reading this specification, those skilled in the art will now appreciate that, under appropriate circumstances, considering such issues as future technology, operating system, cost, etc., other input device APIs, such as, for example, HID Manager, other MICROSOFT® APIs, etc., may suffice.

Command mapping system 100 preferably comprises command mapper 200, as shown. Command mapper 200 preferably reads input from input device 196 (step reading input device 210), preferably using input device API 155, as shown. Command mapper 200 preferably then translates (step translate into command 317 shown in FIG. 4) such read input to at least one command 445 (see FIG. 3) understood by at least one application (shown as application 160, application 163 and application 166), preferably comprising at least one computer game, alternately preferably at least one music player, alternately preferably at least one video player. Upon reading this specification, those skilled in the art will now appreciate that, under appropriate circumstances, considering such issues as future technology, cost, user preference, etc., other applications, such as, for example, operating system user interfaces, word processors, databases, etc., may suffice.

After translating, command mapper 200 preferably writes (step writing commands 220) command 445 into input device API 155 for application 166, alternately preferably to event queue 150 (step send command to queue 230) for application 160. Alternately preferably, when command 445 comprises at least one execution command 770 (see FIG. 3), command mapper 200 directly executes application 163 (step activating software 240), as shown.

Input device API 155 preferably is capable of reading from multiple input devices 196, as shown. Input devices 196 may preferably comprise, as shown, keyboard 113, mouse 116, at least one game controller 120 (at least herein embodying wherein such at least one first human interface device comprises at least one game controller structured and arranged to provide input to assist controlling such at least one second application), and at least one feedback-enabled game controller 125 (at least herein embodying wherein such at least one first human interface device comprises at least one feedback-enabled game controller structured and arranged to provide input to assist controlling such at least one second application while also able to receive feedback from such at least one second application; and at least herein embodying wherein such at least one second human interface device comprises at least one feedback-enabled game controller structured and arranged to provide input to assist controlling such at least one first application while also able to receive feedback from such at least one first application). Upon reading the teachings of this specification, those skilled in the art will now appreciate that, under appropriate circumstances, considering such issues as future technology, control interfacing, cost, etc., other input devices, such as for example, sensors, physiological scanners, motion detectors, neural interfaces, etc., may suffice.

Keyboard 113 and/or mouse 116 are preferably readable, as shown, using event queue 150 (step read input 145) and preferably using input device API 155 (step read input 140). Game controller 120 and feedback-enabled game controller 125 are preferably readable, as shown, in step read game controller 130, using input device API 155. Additionally feedback-enabled game controller 125 preferably may receive feedback using input device API 155 (step receiving feedback 135), as shown.

In event translation mode 300 (see FIG. 4), command mapper 200 preferably reads input, in step reading input device 210, and preferably writes at least one command 445 in step send commands to queue 230, as shown. Application 160 preferably receives command 445 from event queue 150 (step receive event commands 192) and produces output 185, as shown, in response to executing command 445.

In command translation mode 400 (see FIG. 5), command mapper 200 preferably reads input, in step reading input device 210, and preferably writes command 445 in step writing commands 220, as shown. Application 166 preferably receives command 445 from operating system input device API 155 (step receive commands 190) and produces output 185, as shown, in response to executing command 445.

In command and feedback translation mode 500 (see FIG. 6), application 166 may, in addition to receiving commands 445 in the steps of command translation mode 400, produce and send feedback 625 (step send feedback 194) to input device API 155, as shown, which may in turn be received by feedback-enabled game controller 125 in step receiving feedback 135.

When command 445 is one of execution commands 770, command mapper 200 executes application 163 directly, as shown. Application 163 executes and produces output 185 to output device 180, as shown. Execution of application 163 preferably comprises running of application 163, alternately preferably activation of at least one file associated with application 163.

Event translation mode 300, command translation mode 400 and command and feedback translation mode 500 are not mutually exclusive and command mapper 200 may utilize each individually or in any combination thereof.

Figure 2:
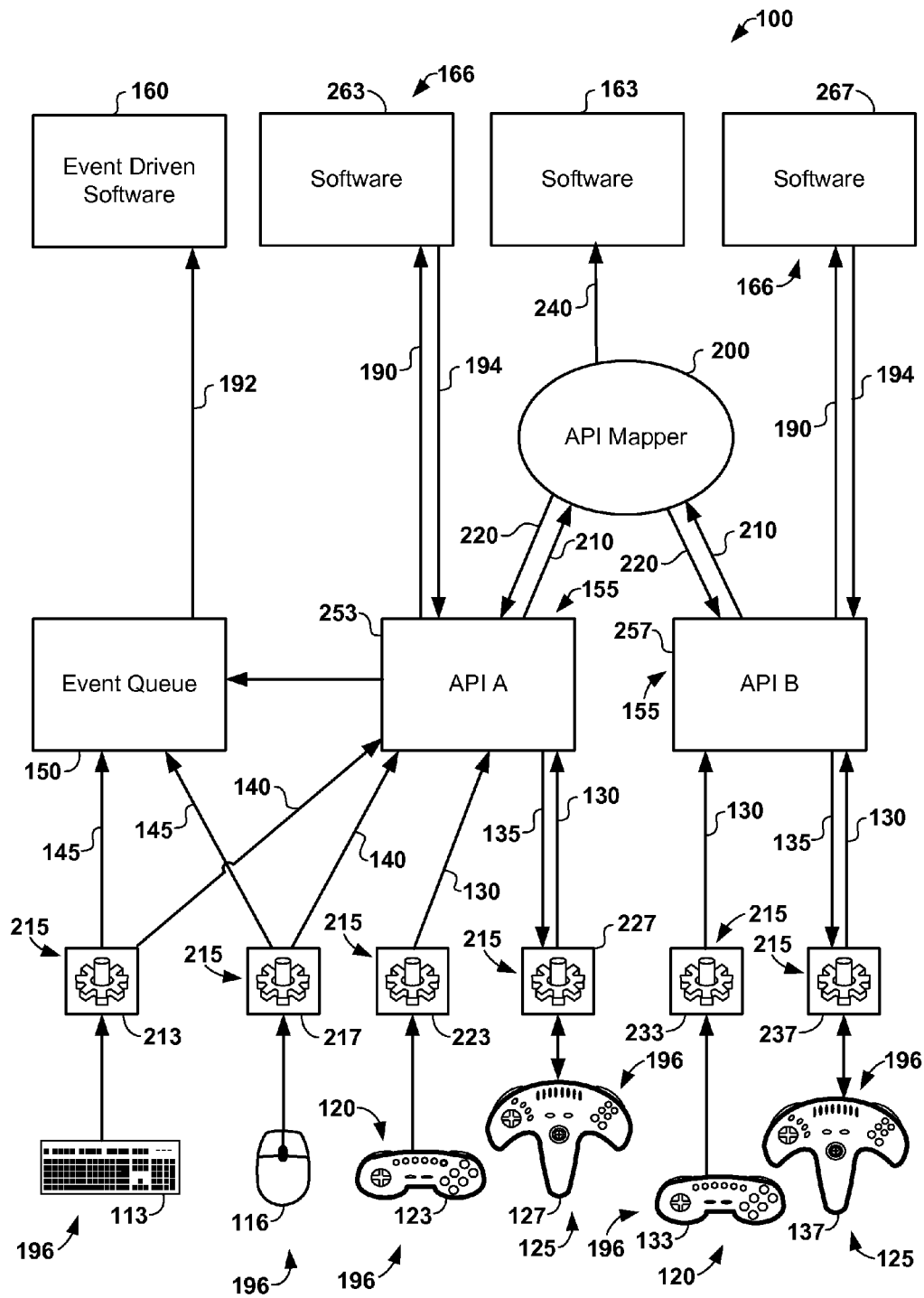
FIG. 2 shows a diagrammatic flow chart of the command mapping system, illustrating the command mapper interfacing with multiple input device APIs, according to the preferred embodiment of FIG. 1.

FIG. 2 shows a diagrammatic flow chart of command mapping system 100, illustrating command mapper 200 interfacing with multiple input device APIs 155, according to the preferred embodiment of FIG. 1. Input device API 155 preferably provides at least one application programming interface (API) designed to interact with at least one device driver 215, as shown. Device driver 215 preferably provides device information of one input device 196 to input device API 155, as shown, which may in turn preferably be read by application 166. When both application 166 and input device 196 are compatible with a common input device API 155, commands 445 of application 166 and input device 196 may automatically be transmitted in a default manner. When application 166 and input device 196 are not compatible with a common input device API 155, input device 196 will not operate directly with application 166. Command mapper 200 preferably translates between at least two operating system device API 155, preferably allowing transmission between input device 196 utilizing one operating system device API 155 and application 166 utilizing another operating system device API 155, as shown.

As shown in FIG. 2, operating system 105 preferably comprises at least two input device APIs 155, shown as API 253 and API 257. Application 166 preferably comprises software 263 and software 267, as shown. Software 263 is preferably compatible with API 253 and preferably accepts input through API 253, as shown. API 253 preferably provides an application programming interface for interacting with, as shown, device driver 213, device driver 217, device driver 223 and device driver 227, which preferably provide commands 445, associated with keyboard 113, mouse 116, game controller 123, and feedback-enabled game controller 127 respectively, as shown, for use by API 253. Likewise, software 267 is preferably compatible with API 257, as shown. API 257 preferably interacts with, as shown, device driver 233 and device driver 237, which preferably are associated with game controller 133 and feedback-enabled game controller 137 respectively and preferably provide commands 445 for use by API 257.

In use without command mapper 200, software 267 effectively may be compatible with, provided there is appropriate coding, game controller 133 and feedback-enabled game controller 137; software 263 may be compatible with, provided there is appropriate coding, keyboard 113, mouse 116, game controller 123, and feedback-enabled game controller 127; and application 160 may only be compatible with, provided there is appropriate coding, keyboard 113 and mouse 116.

When using command mapper 200, incompatibilities between input device 196 and application 166 are preferably overcome. To use software 263 with game controller 133, command mapper 200 preferably translates commands from game controller 133, preferably utilizing API 257, as shown, to software 263, preferably utilizing API 253. Command mapper 200 preferably interacts with both API 253 and API 257. In like manner, to use software 263 together with feedback-enabled game controller 137, command mapper 200 preferably translates commands from feedback-enabled game controller 137, preferably utilizing API 257, to software 263, as shown, preferably utilizing API 253. In addition, command mapper 200 preferably translates feedback commands 790 from software 263, preferably utilizing API 253 for input, to feedback-enabled game controller 137, as shown, preferably utilizing API 257 for output.

Directionality of command translation of command mapper 200 preferably is not limited, preferably allowing use of game controller 123 as well as feedback-enabled game controller 127 with software 267 in like manner as game controller 133 and feedback-enabled game controller 127 with software 263, as shown.

Additionally, keyboard 113 and mouse 116 are preferably compatible with API 253. Command mapper 200 preferably may also read keyboard 113 and/or mouse 116 generated commands, utilizing API 253, and translate to software 267, utilizing API 257.

Further, API 253 preferably may interact with event queue 150. Command mapper 200 preferably utilizes access through API 253 to event queue 150 to preferably translate commands to application 160 (being incompatible with either API 253 or API 257 directly), thereby preferably allowing use of input devices 196, whether compatible with API 253 or API 257, with application 160, as well as software 263 and software 267, as shown.

Even when application 160 and input device 196 may be compatible, application 160 may lack the appropriate coding to enable support for input device 196. Command mapper 200 preferably also overcomes inadequate coding support by translating command 445 to a form supported by application 160. When application 160 supports commands 445 from mouse 116 but not from keyboard 113, command mapper 200 preferably translates commands 445 from keyboard 113 into commands 445 from mouse 116; alternately when application 160 supports commands 445 from keyboard 113 but not from mouse 116, command mapper 200 preferably translates commands 445 from mouse 116 into commands from keyboard 113.

Figure 3:
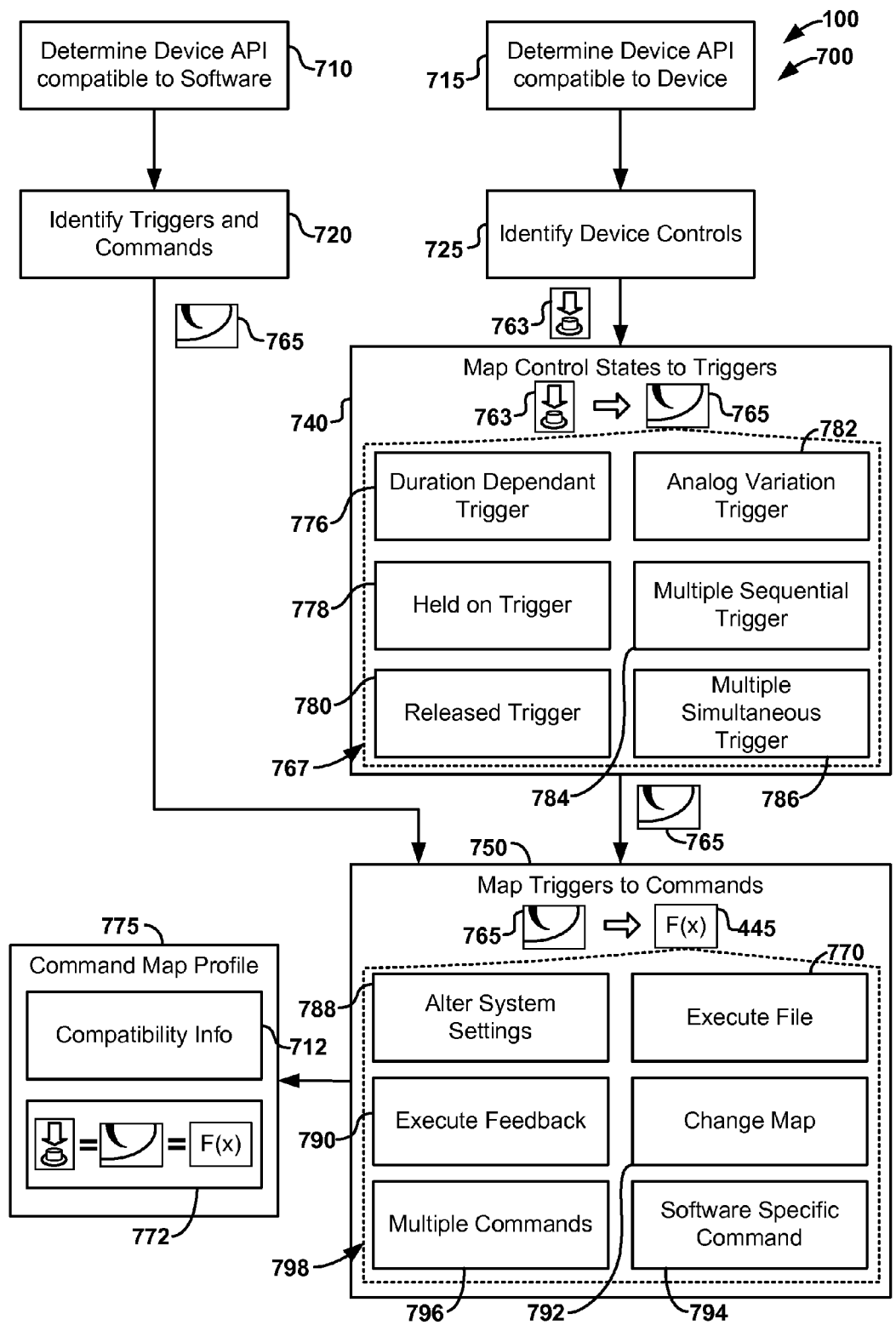
FIG. 3 shows a flow chart of the command mapping system, illustrating command mapping, according to the preferred embodiment of FIG. 1.

FIG. 3 shows a flow chart of command mapping system 100, illustrating command mapping 700, according to the preferred embodiment of FIG. 1. Command mapping 700 preferably maps commands 445, preferably linking control states 763 to triggers 765 and triggers 765 to commands 445, as shown.

Command mapper 200 preferably first identifies which input device API 155 is compatible with application 166 and which input device API 155 is compatible with device driver 215 of input device 196 (see FIG. 2), in steps determine device API compatible to software 710 and determine device API compatible to device 715, as shown. Compatibility information 712 is preferably gathered for use later by command mapper 200 during translation of commands 445.

Following step determine device API compatible to software 710, command mapper 200 preferably identifies commands utilized by application 166, in step identify software triggers and commands 720, as shown. In step identify device controls 725, command mapper 200 preferably identifies device controls and associated control states 763 of input device 196, after step determine device API compatible to device 715, as shown.

In step map control states to triggers 740, control states 763, identified in step identify device controls 725, are preferably associated with at least one device trigger 765. Device trigger 765 preferably comprises one device trigger type 767. Device trigger types 767 preferably comprise, as shown, duration dependent triggers 776, held triggers 778, release triggers 780, analog variation triggers 782, multiple sequential triggers 784, and multiple simultaneous triggers 786. Upon reading this specification, those skilled in the art will now appreciate that, under appropriate circumstances, considering such issues as cost, future technology, user preference, etc., other triggers, such as, for example, scheduled triggers, neural triggers, resonance triggers, etc., may suffice.

Duration dependent triggers 776 (at least herein embodying wherein one of such distinguished multiple behaviors comprises duration dependent activation of one of such at least one first control function) preferably comprise tapping of a button or key, being a short duration, and holding and then releasing a button or a key after a span of time, being a long duration. Upon reading this specification, those skilled in the art will appreciate that, under appropriate circumstances, considering such issues as future technology, user preferences, etc., other duration dependent triggers, such as, for example, rapid sequential control toggling, timed multiple toggling of controls, holding other controls in an active state for a duration, etc., may suffice.

Held triggers 778 (at least herein embodying wherein one of such distinguished multiple behaviors comprises a continuous active state of one of such at least one first control function) preferably comprise holding a control, a button or a key in an active state. Upon reading this specification, those skilled in the art will now appreciate that, under appropriate circumstances, considering such issues as future technology, user preferences, etc., other held triggers, such as, for example, holding a control stick in an active location, maintaining an internal sensor state, etc., may suffice.

Release triggers 780 (at least herein embodying wherein one of such distinguished multiple behaviors comprises release from an active state of one of such at least one first control function) preferably comprise releasing a control, a button or a key from a held state to a neutral inactive state. Upon reading this specification, those skilled in the art will now appreciate that, under appropriate circumstances, considering such issues as future technology, user preferences, etc., other release triggers, such as, for example, releasing a control stick from a held state to a neutral inactive state, returning a pitch sensor to a level state, allowing a sensor to return to an inactive state, etc., may suffice.

Analog variation triggers 782 (at least herein embodying wherein one of such distinguished multiple behaviors comprises variation of position of such at least one first control function) preferably comprise variation in the position of an analog control stick, variation of a throttle stick, mouse movement, trackball movement, and rotation of a rotary control. Upon reading this specification, those skilled in the art will now appreciate that, under appropriate circumstances, considering such issues as future technology, control devices, etc., other analog variation triggers, such as, for example, variation in movement sensors, variation in pitch sensors, variation in analog elevation buttons, variation in analog pressure sensors, etc., may suffice.

Multiple sequential triggers 784 (at least herein embodying wherein one of such distinguished multiple behaviors comprises multiple sequential activations such at least one first control function) preferably comprise sequentially activating at least one control, at least one button or at least one key. Upon reading this specification, those skilled in the art will appreciate that, under appropriate circumstances, considering such issues as future technology, available controls, etc., other multiple sequential triggers, such as, for example, following multiple cardinal directions with a mouse or joystick, sequentially combining a control stick motion with a button or key, etc., may suffice.

Multiple simultaneous triggers 786 (at least herein embodying wherein one of such distinguished multiple behaviors comprises multiple simultaneous activations of at least two of such at least one first control function) preferably comprise activating at least two of controls, buttons or keys simultaneously. Upon reading this specification, those skilled in the art will appreciate that, under appropriate circumstances, considering such issues as future technology, available controls, etc., other multiple simultaneous triggers, such as, for example, simultaneously pitching the input device while pressing a button or a key, simultaneously combining a control stick motion with a button or key, etc., may suffice.

Once device trigger 765 (at least embodying herein at least one control function behavior distinguisher computer processor structured and arranged to distinguish multiple behaviors of such at least one first control function; and at least embodying herein at least one control function behavior distinguisher computer processor means for distinguishing multiple behaviors of such at least one first control function) is associated with control state 763, device trigger 765 is preferably associated with command 445, as shown. Multiple device state-trigger-command associations preferably comprise at least one command translation lookup table 772, as shown. Command mapper 200 preferably uses command translation lookup table 772 in at least one configuration profile 775. Configuration profile 775 preferably further comprises compatibility information 712. configuration profile 775 (at least embodying herein control function association computer storage structured and arranged to assist storing at least one association between at least one first control function and at least one second control function; and at least embodying herein control function association computer storage means for assisting storing at least one association between at least one first control function and at least one second control function) preferably is stored using storage device 178 (see FIG. 1).

Each command 445 preferably comprises at least one command type 798, as shown, preferably comprising software specific commands 794, multiple commands 796, execution commands 770, change profile commands 792, feedback commands 790, alter system settings commands 788. Upon reading this specification, those skilled in the art will now appreciate that, under appropriate circumstances, considering such issues as cost, future technologies, etc., other command types, such as, for example, environment altering commands, combination commands, etc., may suffice.

Software specific commands 794 preferably comprise movement commands (i.e. move left, move right, move up, move down, etc.), action commands (i.e. fire, talk, open, close, etc.), music player commands (i.e. play, stop, pause, etc.). Software specific commands 794 are preferably provided by application 166 to input device API 155. Upon reading this specification, those skilled in the art will now appreciate that, under appropriate circumstances, considering such issues as future technology, software interactivity, etc., other software specific commands, such as, for example, menu commands, navigation commands, device activation commands, etc., may suffice.

Multiple commands 796 preferably comprise serial commands, continuous commands, and cycling commands. Serial commands preferably comprise use of multiple commands in series, providing the ability to attach a single trigger to multiple commands, preferably in sequence. Continuous commands preferably comprise allowing a command to be continuously sent once triggered until being triggered again, preferably creating an "on" command and an "off" command. Cycling commands preferably comprise allowing a list of commands to be cycled through, one command per triggering, sending a command then moving on to the next command in the list. Upon reading this specification, those skilled in the art will now appreciate that, under appropriate circumstances, considering such issues as future technologies, user preferences, etc., other multiple commands, such as, for example, conditional commands, timed sequence commands, etc., may suffice.

Execution commands 770 (at least herein embodying wherein such at least one second control function comprises at least one application executer) preferably comprise execution of a program file, execution of a sound effect, and opening a file for execution in a program. Execution commands 770 preferably provide auxiliary functions otherwise not available during interaction with application 166 (or application 160). Upon reading this specification, those skilled in the art will now appreciate that, under appropriate circumstances, considering such issues as future technologies, user preferences, etc., other execution commands, such as, for example, starting a background application, activating a peripheral, etc., may suffice.

Change profile commands 792 (at least herein embodying wherein such at least one second control function comprises at least one control function association adjuster) preferably comprise changing the active profile, preferably as a "mode" state and altering existing mapping in the current profile, preferably as a "shift" state. Change profile commands 792 preferably provides command mapper 200 with the ability to assign different commands 445 to the same triggers 765, thereby expanding the abilities of input device 196 to trigger more commands 445. Upon reading this specification, those skilled in the art will now appreciate that, under appropriate circumstances, considering such issues as future technologies, user preferences, etc., other change profile commands, such as, for example, add new command on the fly, remove command on the fly, change triggering to continuous, etc., may suffice.

Feedback commands 790 (at least herein embodying wherein such at least one second control function comprises at least one feedback function) preferably comprise activating feedback controls in input device 196 and activating visual feedback effects in application 166 (or application 160). Feedback commands 790 preferably provide physical or visual feedback to in-program events. Feedback commands 790 may preferably be activated by programming in application 166, alternately preferably be activated by trigger 765. Feedback commands 790 may preferably provide support for feedback when application 166 does not already provide feedback, including "vibrating" the visual display through the use of rapid random movement commands. Upon reading this specification, those skilled in the art will now appreciate that, under appropriate circumstances, considering such issues as future technologies, user preferences, etc., other feedback commands, such as, for example, activating a secondary feedback device, activating feedback based on sound, etc., may suffice.

Alter system settings commands 788 (at least herein embodying wherein such at least one second control function comprises at least one operating system settings adjuster) preferably comprises adjusting system volume and altering display resolutions. Alter system settings commands 788 preferably directly alter system settings without exiting application 166, providing adjustability to system environment while still running application 166. Upon reading this specification, those skilled in the art will now appreciate that, under appropriate circumstances, considering such issues as future technologies, system functionality, etc., other alter system settings commands, such as, for example, zooming in visual display, taking screenshots, activating peripherals, etc., may suffice.

Although command mapping 700 may provide configuration profile 775 automatically, command mapping 700 is preferably performed by a user. Such user preferably chooses application 166 as well as input device 196 and follows procedure of command mapping 700 to obtain configuration profile 775 customized to the user's preference.

Figure 4:
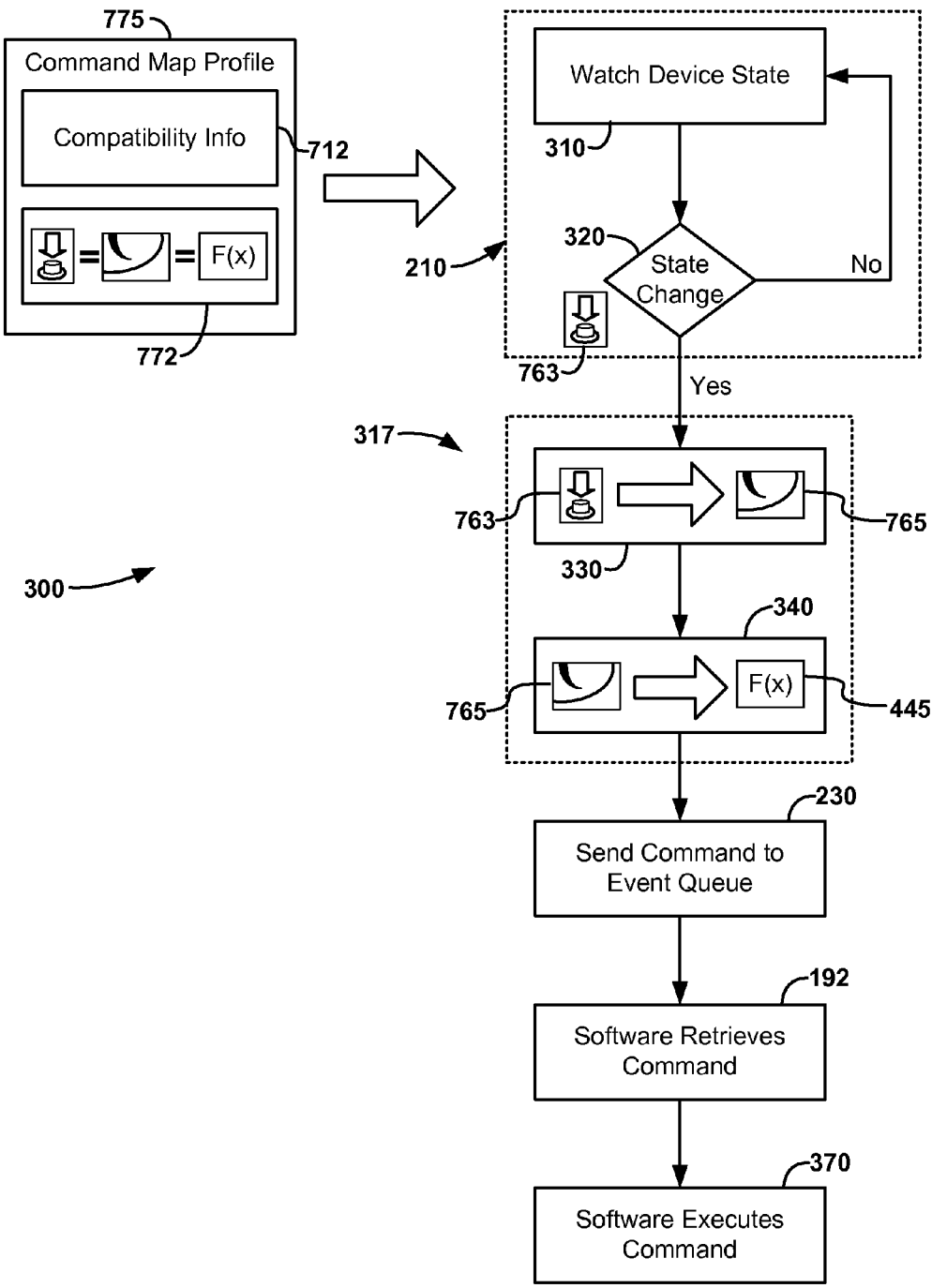
FIG. 4 shows a flow chart of the command mapping system, illustrating event translation mode, according to the preferred embodiment of FIG. 1.

FIG. 4 shows a flow chart of command mapping system 100, illustrating event translation mode 300, according to the preferred embodiment of FIG. 1. Command mapper 200 preferably may translate triggers 765 into commands 445 for use with event queue 150, using event translation mode 300. In step reading input device 210, command mapper 200 preferably performs steps watch device state 310 and check for state change 320. In step watch device state 310, command mapper 200 reads control state 763 of each control of input device 196. A comparison is made between control states 763 from at least one prior reading and control states 763 from current reading, in step check for state change 320. If no change in control state 763 occurs, command mapper 200 repeats step watch device state 310, as shown. This arrangement embodies herein control function intercepting computer processor structured and arranged to assist intercepting such at least one first control function in at least one first control interface compatible with at least one first human interface device and at least one first application; and this arrangement at least embodies herein control function intercepting computer processor means for assisting intercepting such at least one first control function in at least one first control interface compatible with at least one first human interface device and at least one first application.

When a change in control state 763 occurs, command mapper 200 proceeds to step translate into command 317, as shown. Step translate into command 317 preferably comprises step match state change to trigger 330 and step match trigger to command 340. In step match state change to trigger 330, command mapper 200 preferably matches control state 763 to trigger 765, preferably using command translation lookup table 772. Should trigger 765 require a sequence of control states 763 (i.e. active state>inactive state=key-press), command mapper 200 preferably waits for the full sequence of control states 763 to activate trigger 765.

In step match trigger to command 340, command mapper 200 matches trigger 765 to command 445. Command mapper 200 preferably uses command translation lookup table 772 to perform step match trigger to command 340.

Once command 445 is determined, command mapper 200 preferably sends command 445 to event queue 150, in step send command to queue 230, as shown. Application 160 preferably receives command 445 from event queue 150, in step receive event commands 192, and then preferably executes command 445, in step execute event command 370, as shown.

In use, command mapper 200, using event translation mode 300, preferably extends compatibility of application 160 to include game controller 120 and feedback-enabled game controller 125.

Figure 5:
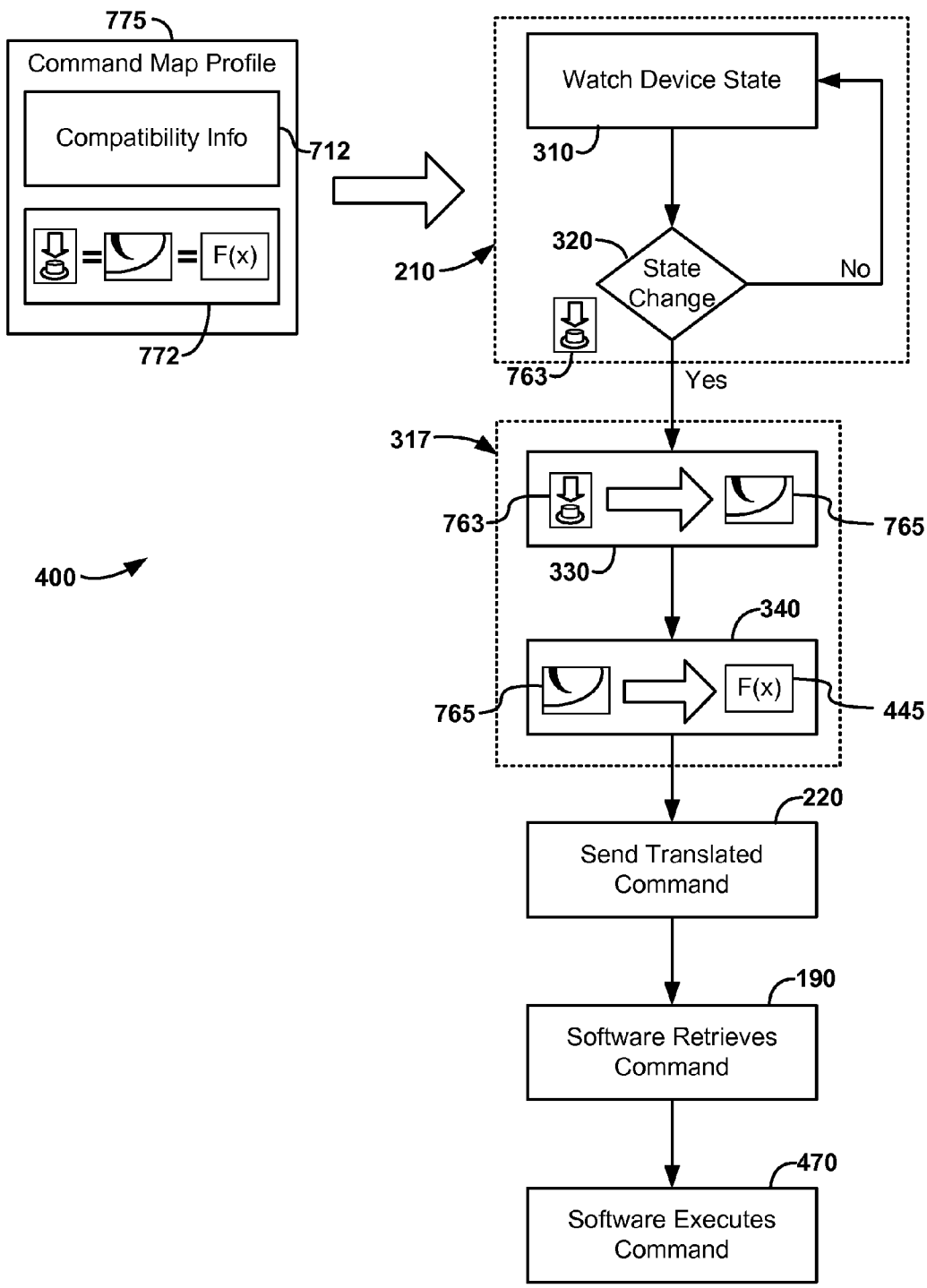
FIG. 5 shows a flow chart of the command mapping system, illustrating command translation mode, according to the preferred embodiment of FIG. 1.

FIG. 5 shows a flow chart of command mapping system 100, illustrating command translation mode 400, according to the preferred embodiment of FIG. 1. In command translation mode 400, command mapper 200 utilizes step reading input device 210 and step translate into command 317 similarly as in event translation mode 300. Profile 775 contains compatibility information 712, relating to which input device API 155 is compatible with input device 196, as well as which input device API 155 is compatible with application 166. Using profile 775, command mapper 200 watches control state 763 of input device 196 (step watch device state 310), and checks for changes in control state 763 (step check for state change 320). Likewise, utilizing profile 775, command mapper 200 matches control state 763 to trigger 765 (step match state change to trigger 330), then matches trigger 765 to command 445 (step match trigger to command 340), as shown.

Since in command translation mode 400 commands are translated for use in input device API 155 instead of event queue 150, step writing commands 220 replaces step send command to queue 230. In step writing commands 220, command mapper 200 preferably sends command 445 to input device API 155, according to compatibility information 712. This arrangement at least embodies herein control function injecting computer processor structured and arranged to assist injecting such at least one second control function, according to such at least one association, into at least one second control interface compatible with at least one second human interface device and at least one second application; and this arrangement at least embodies herein control function injecting computer processor means for assisting injecting such at least one second control function, according to such at least one association, into at least one second control interface compatible with at least one second human interface device and at least one second application.

Further, since in command translation mode 400 commands are delivered to input device API 155, application 166 preferably retrieves command 445 from input device API 155 in step receive commands 190. Once command 445 is retrieved, application 166 preferably executes command 445 in step execute command 470.

In use, command translation mode 400 preferably allows translation of commands 445 between different input device APIs 155. Application 166, preferably using command mapper 200, preferably is now compatible with any input device 196, regardless of which input device API 155 input device 196 utilizes. This arrangement at least embodies herein wherein such at least one first human interface device and such at least one first application are rendered compatible with such at least one second human interface device and such at least one second application.

Further, command translation mode 400 preferably may also read from and send to one input device API 155 for both application 166 and input device 196. Since command mapper 200 preferably maps device states 763 to triggers 765 then commands 445, command mapper 200 increases the number of commands 445 input device 196 is capable of triggering; input device 196 is no longer limited to matching each control to one command. Therefore, even when application 166 and input device 196 would ordinarily be compatible, command mapper 200 increases what commands 445 input device 196 and application 166 can use.

Figure 6:
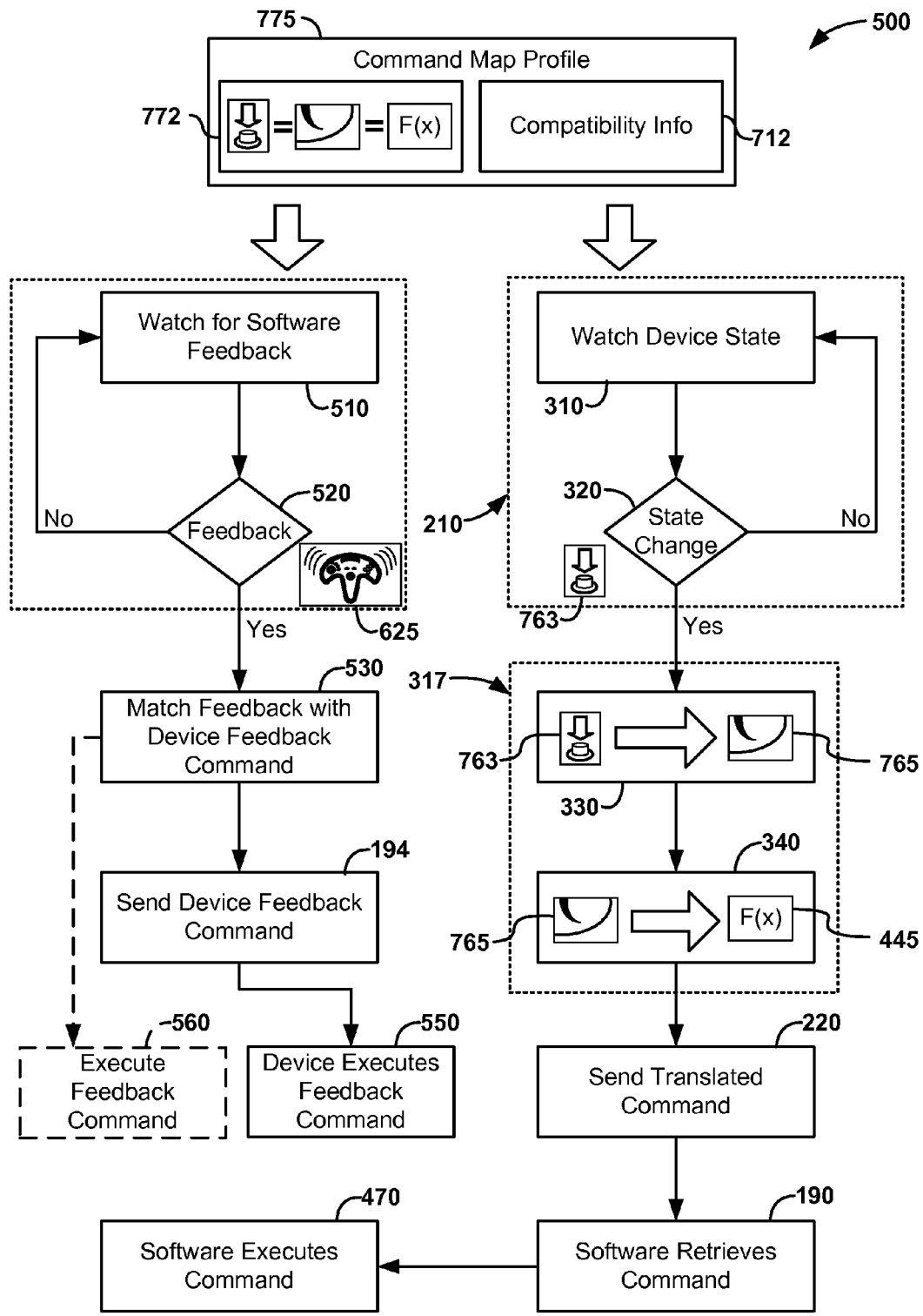
FIG. 6 shows a flow chart of the command mapping system, illustrating command and feedback translation mode, according to the preferred embodiment of FIG. 1.

FIG. 6 shows a flow chart of command mapping system 100, illustrating command and feedback translation mode 500, according to the preferred embodiment of FIG. 1. In command and feedback translation mode 500, translating of commands 445 from input device 196 proceeds in the same manner as in command translation mode 400, as shown. In addition, command and feedback translation mode 500 is also preferably capable of translating at least one command 445 from application 166 to input device 196, for feedback 625.

Translation of command 445 for feedback 625 preferably follows a similar set of steps to that of translating commands 445 from input device 196, as shown. Using compatibility information 712 contained in profile 775, command mapper 200 watches application 166 for generation of feedback 625, in step watch for feedback 510. When step feedback check 520 registers feedback 625 exists, command mapper 200 preferably matches feedback 625 to command 445, usually feedback command 790 (see FIG. 2), in step Match feedback to command 530. Command 445 from feedback 625 is preferably sent to feedback-enabled game controller 125, in step send feedback 194, and feedback-enabled game controller 125 preferably executes command 445, in step execute feedback 550, as shown. Alternately, command 445 may preferably be executed, in alternate step execute feedback 560. Alternate step execute feedback 560 may be used when either input device 196 is incompatible with feedback 525 or when feedback 525 is desired to be re-routed to enact a different response as described in FIG. 3.

In use, command and feedback translation mode 500 preferably extends the same compatibilities realized in command translation mode 400 to include compatibility for feedback 625. Feedback-enabled game controller 125 preferably is now compatible with application 166 no matter which input device API 155 is used by application 166. Further, feedback 625 from application 166 may preferably be utilized in alternate manners, thereby providing feedback 625 even when input device 196 is incompatible with feedback 625.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A computer system, relating to rendering at least one first human interface device and at least one first application compatible with at least one second human interface device and at least one second application, said computer system comprising:

a) at least one control function association computer storage structured and arranged to assist storing at least one input device command association between at least one first control function and at least one second control function;
b) at least one control function intercepting computer processor structured and arranged to assist intercepting the at least one first control function in at least one first control interface compatible with at least one first human interface device and at least one first application;
c) at least one control function behavior distinguisher computer processor structured and arranged to distinguish multiple behaviors of the at least one first control function, and
d) at least one control function injecting computer processor structured and arranged to assist injecting the at least one second control function, according to the at least one input device command association, into at least one second control interface compatible with at least one second human interface device and at least one second application;
e) wherein the at least one first control function is translated and/or injected into the at least one second control interface.

2. The computer system according to claim 1 wherein said at least one control function behavior distinguisher computer processor comprises at least one control function duration behavior distinguisher computer processor structured and arranged to distinguish duration dependent activation of one of the at least one first control function.

3. The computer system according to claim 1 wherein said at least one control function behavior distinguisher computer processor comprises at least one control function continuously active behavior distinguisher computer processor structured and arranged to distinguish a continuous active state of one of the at least one first control function.

4. The computer system according to claim 1 wherein said at least one control function behavior distinguisher computer processor comprises at least one control function releasing behavior distinguisher computer processor structured and arranged to distinguish release from an active state of one of such the at least one first control function.

5. The computer system according to claim 1 wherein said at least one control function behavior distinguisher computer processor comprises at least one control function sequential activation behavior distinguisher computer processor structured and arranged to distinguish multiple sequential activations of the at least one first control function.

6. The computer system according to claim 1 wherein said at least one control function behavior distinguisher computer processor comprises at least one control function sequential activation behavior distinguisher computer processor structured and arranged to distinguish multiple simultaneous activations of at least two of the at least one first control function.

7. The computer system according to claim 1 wherein said at least one control function behavior distinguisher computer processor comprises at least one control function position variation behavior distinguisher computer processor structured and arranged to distinguish variation of position of the at least one first control function.

8. A computer system, relating to rendering at least one first human interface device and at least one first application compatible with at least one second human interface device and at least one second application, said computer system comprising:
a) at least one control function association computer storage structured and arranged to assist storing at least one input device command association between at least one first control function and at least one second control function;
b) at least one control function intercepting computer processor structured and arranged to assist intercepting the at least one first control function in at least one first control interface compatible with at least one first human interface device and at least one first application;
c) at least one control function injecting computer processor structured and arranged to assist injecting the at least one second control function, according to the at least one input device command association, into at least one second control interface compatible with at least one second human interface device and at least one second application; and
d) at least one control function behavior distinguisher computer processor structured and arranged to distinguish multiple behaviors of the at least one first control function;
e) wherein the at least one first control function is translated and/or injected into the at least one second control interface;
f) wherein said at least one control function behavior distinguisher computer processor comprises at least one computer processor selected from the group consisting of
  i) at least one control function duration behavior distinguisher computer processor structured and arranged to distinguish duration dependent activation of one of the at least one first control function,
  ii) at least one control function continuously active behavior distinguisher computer processor structured and arranged to distinguish a continuous active state of one of the at least one first control function,
  iii) at least one control function releasing behavior distinguisher computer processor structured and arranged to distinguish release from an active state of one of the at least one first control function,
  iv) at least one control function sequential activation behavior distinguisher computer processor structured and arranged to distinguish multiple sequential activations of the at least one first control function,
  v) at least one control function sequential activation behavior distinguisher computer processor structured and arranged to distinguish multiple simultaneous activations of at least two of the at least one first control function, and
  vi) at least one control function position variation behavior distinguisher computer processor structured and arranged to distinguish variation of position of the at least one first control function;
g) wherein said at least one control function injecting computer processor comprises at least one computer processor selected from the group consisting of
  i) at least one settings adjusting computer processor structured and arranged to assist adjusting operating system settings,
  ii) at least one executing computer processor structured and arranged to assist executing at least one application,
  iii) at least one feedback producing computer processor structured and arranged to assist producing at least one feedback effect, and
  iv) at least one input device command association adjusting computer processor structured and arranged to assist adjusting the at least one input device command association; and h) wherein said at least one control function intercepting computer processor comprises at least one computer processor selected from the group consisting of
   i) at least one game controller origin intercepting computer processor structured and arranged to assist intercepting the at least one first control function originating from at least one game controller,
   ii) at least one feedback-enabled game controller origin intercepting computer processor structured and arranged to assist intercepting the at least one first control function originating from at least one feedback-receiving-enabled game controller,
   iii) at least one keyboard origin intercepting computer processor structured and arranged to assist intercepting the at least one first control function originating from at least one keyboard, and
   iv) at least one mouse origin intercepting computer processor structured and arranged to assist intercepting the at least one first control function originating from at least one mouse.

9. The computer system according to claim 8 wherein said at least one control function injecting computer processor comprises at least one feedback-enabling injecting computer processor structured and arranged to assist injecting the at least one second control function, according to the at least one input device command association, into at least one second control interface compatible with at least one feedback-enabled human interface device.

10. A computer system, relating to rendering at least one first human interface device and at least one first application compatible with at least one second human interface device and at least one second application, said computer system comprising:
   a) at least one control function association computer storage structured and arranged to assist storing at least one input device command association between at least one first control function and at least one second control function;
   b) at least one control function intercepting computer processor structured and arranged to assist intercepting the at least one first control function in at least one first control interface compatible with at least one first human interface device and at least one first application, the at least one control function intercepting computer processor comprises one or more elements selected from the group of:
      i) at least one game controller origin intercepting computer processor structured and arranged to assist intercepting the at least one first control function originating from at least one game controller,
      ii) at least one feedback-enabled game controller origin intercepting computer processor structured and arranged to assist intercepting the at least one first control function originating from at least one feedback-receiving-enabled game controller,
      iii) at least one keyboard origin intercepting computer processor structured and arranged to assist intercepting the at least one first control function originating from at least one keyboard,
      iv) at least one control function intercepting computer processor comprises at least one mouse origin intercepting computer processor structured and arranged to assist intercepting the at least one first control function originating from at least one mouse,
      v) at least one feedback-enabling injecting computer processor structured and arranged to assist injecting the at least one second control function, according to the at least one association, into at least one second control interface compatible with at least one feedback-enabled human interface device;
   c) at least one control function injecting computer processor structured and arranged to assist injecting the at least one second control function, according to the at least one input device command association, into at least one second control interface compatible with at least one second human interface device and at least one second application, the at least one control function injecting computer processor comprises one or more elements selected from the group of:
      i) at least one settings adjusting computer processor structured and arranged to assist adjusting operating system settings,
      ii) at least one executing computer processor structured and arranged to assist executing at least one application,
      iii) at least one feedback producing computer processor structured and arranged to assist producing at least one feedback effect,
      iv) at least one control function injecting computer processor comprises at least one association adjusting computer processor structured and arranged to assist adjusting the at least one association;
   d) wherein the at least one first control function is translated and/or injected into the at least one second control interface.

* * * * *